Figure 1:
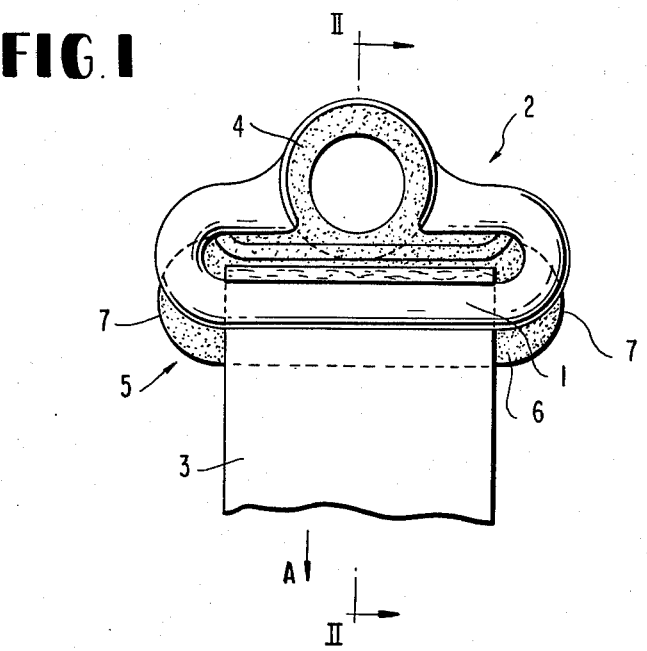

United States Patent [19]

Scholz et al.

[11] 4,142,274
[45] Mar. 6, 1979

[54] GUIDE INSTALLATION FOR A BELT-BAND ADAPTED TO BE WOUND-OFF OR ON A MAGAZINE ROLL OF A SAFETY BELT SYSTEM

[75] Inventors: Hansjürgen Scholz, Echterdingen; Walter Jahn, Sindelfingen; Jürgen Gimbel, Gechingen, all of Fed. Rep. of Germany

[73] Assignee: Daimler-Benz Aktiengesellschaft, Fed. Rep. of Germany

[21] Appl. No.: 783,738

[22] Filed: Apr. 1, 1977

[30] Foreign Application Priority Data

Apr. 1, 1976 [DE] Fed. Rep. of Germany ....... 2613987

[51] Int. Cl.² .................. B60R 21/10; A62B 35/02
[52] U.S. Cl. ................... 24/163 R; 280/747; 297/389
[58] Field of Search ............ 24/163 FC, 163 R, 196, 24/197, 198, 200, 265 R, 265 AL, 183; 280/747; 297/388, 389

[56] References Cited

U.S. PATENT DOCUMENTS

| 1,264,996 | 5/1918 | Tabler ........................... 24/200 |
| 3,877,114 | 4/1975 | Silen ............................. 24/163 R |
| 3,959,855 | 6/1976 | Fisher .......................... 24/163 FC |
| 4,005,904 | 2/1977 | Weman et al. ................ 24/163 R |
| 4,023,826 | 5/1977 | Kokubo et al. ............... 24/163 R |

Primary Examiner—Kenneth J. Dorner
Attorney, Agent, or Firm—Craig & Antonelli

[57] ABSTRACT

A guide installation for a belt-band adapted to be wound-on and wound-off a magazine roll of a safety belt system which is arranged within the area of an after-connected deflection fitting; the guide installation is claw-shaped and thereby surrounds the deflection web of the deflection fitting with a spacing for passage of the belt-band over a portion of the circumference of the deflection web, whereby the spacing is smaller than twice the thickness of the belt band; at least the inlet portion of the guide installation pointing in the direction toward the magazine roll also includes a section that extends essentially parallel to the extension direction of the associated belt-band.

7 Claims, 2 Drawing Figures

GUIDE INSTALLATION FOR A BELT-BAND ADAPTED TO BE WOUND-OFF OR ON A MAGAZINE ROLL OF A SAFETY BELT SYSTEM

The present invention relates to a guide installation for a belt-band adapted to be wound-off or on a magazine roll of a safety belt system within the area of a deflection fitting connected after the same.

In order to prevent a twisting of the reeling-on belt-band, it is known from the German Offenlegungsschrift No. 2,426,360 to secure the guide installation by means of a retaining member directly adjoining the deflection fitting. The guide installation is thereby constructed as bow-shaped member which is pointed in the direction of the incoming belt-band. However, contrary to the understanding represented in the German Offenlegungsschrift No. 2,426,360, namely that the belt-band could twist only during the belt retraction or pulling-in operation, it has been discovered that a twisting, doubling-up or jamming of the belt-band will occur precisely during the pulling-out of the belt-band. This may be explained on the basis of the fact that the return force of the belt-roll as a rule does not suffice to pull a doubled-up belt-band through the slot of the deflection fitting. In contrast thereto, the pulling-out force which may be applied by the belt user is sufficiently high in order to pull a double-layered belt-band through the deflection fitting with a jerk.

The handling of a twisted belt-band is rendered very difficult and leads according to past experience to an abandonment or avoidance of the safety belt after a very short period of time. Also, the elimination of the disturbance can be very complicated and can frequently be carried out only be expert personnel. This is the case in particular for belt-rollers and deflection fittings arranged covered off, for example, on the inside of the center column of a motor vehicle.

It is therefore the task of the present invention to provide a guide installation for the belt-band which effectively prevents a twisting, doubling-up or jamming thereof and which is so constructed that during normal operation, no additional friction and therefore no unnecessary belt-band wear occurs. Furthermore, with a visible installation of the guide installation, the injury danger by the guide installation is to be precluded.

Consequently, a guide installation for a belt-band adapted to be wound-on or off a magazine roll of a safety belt system arranged within the area of an after-connected deflection fitting is proposed, whereby according to the present invention, the guide installation is claw-shaped and surrounds the deflection web of the deflection fitting over a part of the circumference of the deflection web with a spacing for passage of the belt-band therethrough, whereby this spacing is smaller than twice the thickness of the belt-band, and whereby at least the inlet portion of the guide installation pointing in the direction toward the magazine roll is provided with a section extending parallel to the extension direction of the associated belt-band.

In one preferred embodiment of the present invention, the inlet portion projects downwardly beyond the deflection web by a predetermined amount.

A simple assembly results if the deflection fitting together with the guide installation forms a structural unit.

The guide installation operates completely satisfactorily over the entire pivot range of the deflection fitting, if the width of the guide installation is larger than the slot width of the deflection fitting.

Accordingly, it is an object of the present invention to provide a guide installation for a belt-band adapted to be wound-on or off a magazine reel of a safety belt system, which avoids by simple means the aforementioned shortcomings and drawbacks encountered in the prior art.

Another object of the present invention resides in a guide installation for the belt-band of a safety belt system which effectively prevents a twisting, doubling-up or jamming of the system.

A further object of the present invention resides in a guide installation for the belt-band of a safety belt system which prevents a jamming of the system due to twisting or doubling-up of the belt-band, yet causes no additional friction during normal operation and therewith no unnecessary wear of the belt-band.

A still further object of the present invention resides in a guide installation of the type described above which precludes an injury danger to the vehicle passengers notwithstanding a visible installation of the guide system in the vehicle interior.

Another object of the present invention resides in a guide installation for the belt-band of a safety belt system which operates completely satisfactorily over the entire pivot range of the deflection fitting, is simple in construction and highly reliable in operation.

Figure 2:
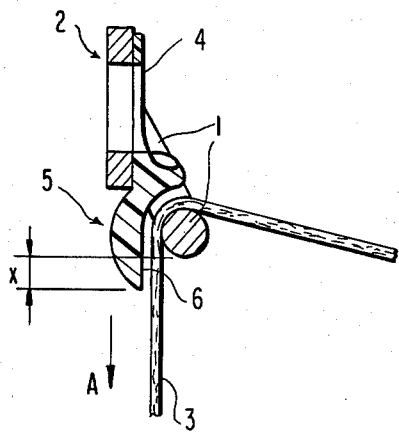

These and other objects, features and advantages of the present invention will become more apparent from the following description when taken in connection with the accompanying drawing which shows, for purposes of illustration only, one embodiment in accordance with the present invention, and wherein:

FIG. 1 is a front elevational view of a guide installation in accordance with the present invention with a deflection fitting and belt-band; and FIG. 2 is a cross-sectional view, taken along line II—II of FIG. 1.

Referring now to the drawing wherein like reference numerals are used throughout the two views to designate like parts, a belt-band 3 which runs over the deflection web 1 of a deflection fitting generally designated by reference numeral 2 and pivotally secured, for example, on the inside of a center or rear column (not shown) of a motor vehicle, leads in the direction of the arrow "A" toward a magazine roll (not shown) of conventional construction. A guide installation 4 is generally claw-shaped and surrounds the deflection web 1 over a portion of the circumference of the deflection web 1. The guide installation 4 is secured and pivotal together with the deflection fitting 2 and includes a lower inlet portion generally designated by reference numeral 5 with a section 6 extending parallel to the belt-band 3. The spacing between the deflection web 1 and the guide installation 4 is for passage of the belt band 3 therethrough. The guide installation 4 is wider than the slot-width of the deflection fitting 2 and has rounded-off side edges 7 which may be slightly bent-up in the direction of the belt band 3. The spacing is smaller than twice the thickness of the belt-band 3.

If now the belt-band 3 arrives at the outer section 6 of the lower inlet portion 5 incorrectly as regards position, then it is smoothed out and aligned, whereby even with a large force-effort it is not possible to pull a double-layered belt-band through the same. Also on the inlet side of the shoulder belt portion which is not illustrated in detail, measures are taken by the construction of the guide installation 4 and by the amount of the distance to the deflection web 1, which permit only a pulling-in of the belt-band 3 which is correct as regards its position.

In a preferred embodiment of the present invention, the inlet portion 5 projects beyond the deflection web 1 by a predetermined amount x (FIG. 2).

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A deflection fitting associated with a belt-band adapted to be wound on and off a magazine roll of a safety belt system, said deflection fitting comprising:
    a deflection web constituting a first part of said deflection fitting and having a circumference, said circumference having a portion arranged for passage of the belt-band thereover, and
    a guide installation constituting a second part of said deflection fitting, said guide installation having a first portion surrounding said portion of said circumference of said deflection web and having a second portion extending substantially parallel to the extension direction of said belt-band, said first portion of said guide installation being separated from said deflection web in the area where the belt-band passes over said portion of said circumference to define a spacing, said spacing being smaller than twice the thickness of said belt-band, whereby said guide installation effectively prevents a twisting, doubling-up, or jamming of said belt-band during normal operation.

2. A deflection fitting according to claim 1, characterized in that the second portion of said guide installation projects downwardly beyond the deflection web.

3. A deflection fitting according to claim 2, characterized in that the deflection web together with the guide installation forms a structural unit.

4. A deflection fitting according to claim 3, characterized in that the width of the guide installation is larger than a slot width of the deflection web.

5. A deflection fitting according to claim 1, characterized in that the deflection web together with the guide installation forms a structual unit.

6. A deflection fitting according to claim 1, characterized in that the width of the guide installation is larger than a slot width of the deflection web.

7. A deflection fitting according to claim 6, characterized in that the deflection web together with the guide installation forms a structural unit.

* * * * *